United States Patent Office 3,551,364
Patented Dec. 29, 1970

3,551,364
PROCESSES FOR MAKING MICROPOROUS POLYURETHANE BODIES EMPLOYING NON-BOILING LIQUID ALKYL ETHERS OR LIQUID ALIPHATIC HYDROCARBONS
John J. McGarr, Beverly, Mass., assignor to USM Corporation, Flemington, N.J., a corporation of New Jersey
No Drawing. Continuation-in-part of application Ser. No. 500,155, Oct. 21, 1965. This application Jan. 23, 1969, Ser. No. 794,478
Int. Cl. C08c *17/08;* C08d *13/08;* C08g *22/44*
U.S. Cl. 260—2.5                                    10 Claims

ABSTRACT OF THE DISCLOSURE

A microporous resilient sheet or coating is formed by casting an emulsion having a reactive mixture as the continuous phase and having dispersed droplets of a volatile liquid as the internal phase. The reaction mixture includes a material having active isocyanate groups and a second material having active hydrogens for reaction with the first material to form a resilient solid. The droplets of liquid are held in the solidified material and the liquid is removed, as by evaporation, leaving pores and discontinuities for passage of air and vapor.

---

This application is a continuation-in-part of application Ser. No. 500,155, filed Oct. 21, 1965 and now abandoned entitled "Microporous Polyurethane Bodies and Processes for Making Employing Non-Boiling Liquid Alkyl Ethers or Liquid Aliphatic Hydrocarbons."

This invention relates to microporous bodies and processes for making microporous bodies and particularly to processes for forming a microporous coating on a base.

The ability to transmit substantial amounts of water vapor is an important requisite of materials for the manufacture of shoes, garments and upholstery. Leather is an excellent material in this regard and likewise possesses a desirable combination of good appearance, durability and protective action.

Leather substitute materials heretofore known have generally comprised a carried layer and a resinous layer on a surface of the carried layer. Effords have been made to develop pores or cells in the resin layer by chemical or mechanical means to provide porosity which would permit escape or transmission of moisture through such materials. In general, the procedures for forming pores or cells have been time consuming and expensive and have been deficient in providing suitable control over the size or character of the pores or cells.

It is an object of the present invention to provide a novel process for forming a porous body, or a supported porous layer in which there are provided pores or spaces of controlled size.

To these ends and in accordance with a feature of the present invention there is provided a novel emulsion including controlled size droplets of liquid dispersed in a continuous phase of reactive, preferably polymeric material convertible through reaction to a tough, solidified resilient film forming condition, the liquid being selected to have no, or only very limited solvent or swelling action on the polymeric material.

It is a further feature of the invention to provide a process for forming a porous body or porous coating by casting or coating the emulsion on a surface and reacting the material to form a tough, solidified material with the droplets of nonsolvent liquid entrapped in the solidified body. The non-solvent liquid of the droplets is then removed without expanding the solidified body leaving spaces constituting openings or pores in the solidified material.

Development of pores or passageways in a coating, film or body of polymeric material involves the action of the dispersed droplets of the nonsolvent liquid in maintaining spaces within the polymeric material and the physical change in the polymeric material in the course of reaction to form a higher molecular weight polymeric material. An initial result of molecular weight increase is an increase in viscosity followed by gelling and solidification of the polymeric material to hold the droplets of liquid within the coating film or body of polymer. Thereafter increasing gel strength is developed through continued reaction of the polymeric material to resist collapse and sealing up of the opening left on removal of the liquid. The spaces occupied by the non-solvent liquid droplets are available after removal of the liquid to provide pores and passageways within the polymeric material. Additionally the reaction to give higher molecular weight, particularly when elements of cross linking are involved, results in a molecular change and resulting physical change which give a desirable form of open cell structure with through passages for transmission of gas or vapor.

A variety of reactive materials may be used in the composition and process. The reactive materials and nonsolvent liquid are selected for cooperation with each other so that reaction to solid condition occurs at temperatures at which the dispersed droplets can be kept in liquid condition. That is, where higher boiling point nonsolvent liquids are used it is possible to use materials which require higher temperatures for reaction than would be possible with lower boiling point nonsolvent liquids. Additionally the reactive materials are selected on the basis of their known properties of providing toughness, flexibility, hardness and other physical properties required in the final product.

The preferred reactive materials are those for forming tough, flexible high strength polyurethane or polyurea reaction products. The reactive material may be a "one shot" mixture of an organic compound having at least two active hydrogens such as a polymeric polyol, e.g. polyalkylene ether polyol and/or polyester polyol, with a reactive compound having at least two reactive —NCO groups, e.g. a polyisocyanate, or may be a prepolymer system in which an —NCO terminated reaction product of polyol with excess polyisocyanate, is combined with chain extenders which may be a polyhydroxy or polyamine compound. The reactive material must be either a liquid or reducible to a liquid by heat or addition of a solvent.

Polyols useful in the "one shot" mixture or for forming the reactive prepolymer include substantially linear or only moderately branched polyether polyols, and substantially linear or moderately branched polyester polyols from the condensation of polybasic acids, e.g. adipic acid, sebacic acid, azelaic acid, dimerized linoleic acid and other aliphatic and aromatic dibasic acids with polyols such as butane diol, ethylene glycol, propylene glycol and the like. Castor oil is also a suitable polyol for making a prepolymer. Controlled portions of polyols or polybasic acids having more than two reactive OH or —COOH groups may be included in the compositions reactive to form polyester polyols to introduce moderate branching or cross linking.

Prepolymers are made by well understood procedures involving reaction of the polyether polyols or the polyester polyols with organic polyisocyantes including the toluene diisocyanates, methylene diisocyanates and the like. A proportion of polyisocyanate material having more than two reactive isocyanate groups may be included to provide a desired extent of cross linking.

The action of the nonsolvent pore-forming liquid is primarily physical, that is, the nonsolvent liquid is a readily removable space filler which is present as dispersed droplets until the coating at least partially solidifies around the droplets and is removed thereafter leaving open spaces and pores. Removal is effected without expansion of the solidified body. Suitable liquids may readily be selected by a chemist on the basis of the known physical properties of liquids. Any liquid having substantial nonsolvency and nonreactivity with the polymeric material together with suitable volatility characteristics may be used. Complete insolubility is not necessary provided an amount is used in excess of the solubility in the continuous phase. Normally liquid aliphatic hydrocarbons including petroleum hydrocarbon fractions, particularly those commercially available as mineral spirits, petroleum naphtha and kerosene which are largely or completely aliphatic in composition are generally prefered because of their low cost and satisfactory behavior in the composition; but other substantially inert organic liquids such as liquid alkyl ethers, e.g. amyl ether and liquid halogenated hydrocarbons, preferably halogenated aliphatic hydrocarbons such as chlorodecane, tetrachloroethylene and tetrachloro-difluoroethane may be used. To avoid premature evaporation from the coating so that it can serve its space filling function until the coating has solidified, the pore-forming liquid is chosen to have a boiling point above the selected reaction temperature and should preferably have a boiling point of at least about 100° C. and preferably at least 130° C. to allow use of temperatures giving a desirable rate of reaction of the polymeric material. On the other hand the liquid will be chosen with low enough boiling point for removal without heat injury to the coating or the base on which it may be disposed. Thus the liquid should ordinarily not contain substantial quantities of high boiling or low volatility components, and preferably at least 90% of the components of the liquid will boil at temperatures under 232° C. It is to be understood that other means than evaporation, e.g. extraction may be used to remove high boiling or low volatility liquid and in such cases the upper limit of boiling point does not apply. Dispersion of droplets of the pore-forming liquid in the liquid body of reactive polymeric material to form an emulsion in which the reactive polymeric material is the continuous phase, is effected by vigorous agitation during the course of addition of the pore-forming liquid to the body of polymeric material. Emulsifying agents are useful to aid in dispersing the liquid in the polymeric material and to stabilize the resulting emulsion. The selection of emulsifying agents is readily made by a chemist acquainted with the techniques of emulsion forming. Preferred emulsifying agents have included anionic and nonionic surface-active agents such as commercially available silicone emulsifiers, partial long chain fatty acid esters and the polyoxyalkylene derivatives of such esters, also sulfuric acid esters of long chain fatty alcohols, etc.

The amount of pore-forming liquid dispersed will vary with the desired porosity of the final product and may vary from as low as 25 parts of the liquid to 100 parts of the polymer up to as high as 300 parts of the liquid to 100 parts of the polymer material. It is preferred to use from about 60 parts to about 200 parts of liquid to 100 parts of the polymeric material. It is desirable that the mechanical conditions of dispersion of the liquid and the polymer be controlled to form very small droplet sizes of which the majority will be in the range of from about 0.001 to about 0.03 mm. in diameter.

Reaction of the polymeric material to higher molecular weight solid condition is brought about and controlled by the time and temperature conditions of bringing together of the reactive components and/or by the introduction of catalyst. In the one step process in which a polymeric polyol such as the polyether polyol or polyester polyol is reacted with a polyisocyanate, mixing and emulsification involves bringing together these materials together with the liquid to be dispersed and a catalyst, such as stannous octoate or lead naphthenate, effective to control the reaction rate. It will be understood that where reaction occurs at so fast a rate that it is difficult to complete the emulsion before excessive increase in viscosity or solidification of the polymeric material takes place, the pore forming liquid may be emulsified in one of the reagents usually the polyether or polyester polyol before combination with the polyisocyanate.

In the two step process, an —NCO terminated prepolymer prepared from a polymeric polyol such as a hydroxyl terminated polyether or polyester and a polyisocyanate, the pore forming liquid, and chain extenders reactive with the prepolymer to give higher molecular weight materials are combined and emulsified with the prepolymer material forming the continuous phase. Chain extenders effective to increase the molecular weight of the prepolymer are compounds having two or more active hydrogen atoms such as p,p'-methylene-dianiline, 4,4'-methylene-bis-(2-chloroaniline), trimethylolpropane, m-phenylenediamine, 1,4-butane diol and triethanolamine.

It will be understood that in any of these types of reactions a controlled amount of solvent may be added to the polymeric material, either the polymeric polyol or the —NCO terminated prepolymer. The solvents if used, are organic liquids substantially non-reactive with the polymeric material or other components of the composition and substantially immiscible with the pore-forming liquid. Volatile organic liquids such as methyl ethyl ketone and benzene are ordinarily used. The solvent will be used to reduce the viscosity of the polymeric material to facilitate the formation of an emulsion and also may be used to reduce the reaction rates between the polymer and the material reacted with the polymer to increase its molecular weight. The solvent slows down the reaction by dilution of the reagents and permits the mixture to remain fluid during the time required for batch processing. With continuous machine mixing and applying equipment, it is generally not necessary to use solvents.

The emulsion is applied and shaped promptly after formation and prior to such time as the reaction has proceeded to a point where gelling of the composition through increase in molecular weight has occurred. A primary utility of the porous material obtained on curing and further treatment of the emulsion is as a relatively thin, tough, flexible, permeable film either per se or in association with a supporting surface; but the composition may also be cast in a mold and treated to produce a porous, molded article of greater thickness.

The coating material may be applied to surfaces by any of a variety of means including spraying, brushing, dipping, knife spreading and so on. Coating thicknesses may range from very thin but continuous deposits, e.g. 8 mils wet thickness, up to as high as 100 mils wet thickness. Surfaces which may be coated include casting surfaces such as glass or a release sheet, e.g. silicone or other treated paper from which the resultant film may be stripped after solidification, and porous bases such as woven or nonwoven fibrous sheet material, paper, felt and so on, on which the deposited material will form a permanent coating.

A preferred base is a tough, open-fibered, flexible sheet material obtained by impregnating an intermeshed fiber mat with an aqueous dispersion of collagen fibers of microscopic size followed by treatment of the impregnated sheet to reaggregate the collagen fibers into a larger collagen fiber structure reinforcing the intermeshed fibers and the initial mat against displacement. Manufacture of such a sheet is described in the Pat. No. 3,223,551 granted Dec. 14, 1965 to Shu-Tung Tu entitled "Leather-Like Material and Method of Making Same." The coating may also be applied to other woven and non-woven fibrous bases.

For providing a porous film integrally united to a supporting layer the emulsion may be spread directly on the supporting surface where the viscosity of the emulsion and the openness of the surface to which applied are such that penetration does not occur to an excessive degree.

Thixotropic additives such as silica aerogel are useful in giving viscosity characteristics resisting excessive penetration. Alternatively the emulsion may be spread on an impervious sheet such as a glass plate or a casting release sheet and thereafter while the emulsion is still fluid the porous sheet of woven or nonwoven textile fibers may be laid down on the coating.

The base with which a coating of the material is to be associated may have some effect on the operation of the system. Particularly when the base preferentially absorbs, for example, the pore-forming liquid component, local conditions adjacent the surface may cause the polymer material adjacent the surface of the base to be less porous than other portions. This factor may be controlled by a preliminary coating of the base, e.g. with a discontinuous deposit of a natural or synthetic rubber or resin such as an acrylic ester polymer or copolymer, to control the absorption action or by a prewetting of the base with that component, i.e., water or organic liquid which tends to become absorbed more readily.

The continuous phase of the emulsion is solidified by development of higher molecular weight through reaction of the polymeric material and when solidified entraps the droplets of liquid. At this point the solidified material may be separated from a glass plate or other impervious surface, if such is used, on which it is cast or may be removed from a mold, and the solidified articles subjected to further treatment to complete the cure. This further curing treatment usually involving heating insures removal by evaporation of the liquid of the entrapped droplets as the cure is completed. It is to be observed that owing to the physical state of the solidified partially cured polymeric material at the time of this further heating, the liquid of the droplets is able to escape without notable enlargement of the pores, this escape occurring through passageways in the continuous phase of the polymeric material. The thickness of the film or article ordinarily decreases in the course of evaporation of the droplets.

The following examples are given to aid in understanding the invention but it is to be understood that the invention is not restricted to the materials, proportions or procedures of the examples.

EXAMPLE I 1.75 grams of a nonionic silicone emulsifier was added to a solution of 30 grams of a polytetramethylene ether glycol urethane prepolymer having a molecular weight of about 2000 containing approximately 4.2% by weight of reactive —NCO in 30 ml. of methyl ethyl ketone.

64 ml. of a liquid paraffinic hydrocarbon mixture with a boiling point range of 346° F. to 405° F. was slowly added with vigorous agitation to the above solution to form an emulsion in which the liquid hydrocarbon was the dispersed phase. 2.9 grams of molten methylene dianiline was added to the emulsion with vigorous agitation to insure uniform mixture and a film of the resulting mixture 0.032 inch in thickness was promptly cast onto a glass plate.

The material of the cast film increased rapidly in viscosity and soon reached a gelled state. The solid material was cured at 100° C. for one hour in a circulating air oven.

The resulting film was stripped from the glass plate as a white, tough, flexible film 0.020 inch in thickness with a fine uniform porous structure. The water vapor transmission rate as determined by standard procedure was 0.94 gram/30 cm.²/24 hrs./20 mils.

EXAMPLE II 60 grams of a glycol-adipate polyester urethane prepolymer having a molecular weight of about 2000 containing approximately 4.2% by weight reactive —NCO was mixed with 3.3 grams of a polyoxyalkylene derivative of sorbitan monooleate as emulsifier and 40 ml. of methyl ethyl ketone. 90 ml. of a liquid paraffinic hydrocarbon mixture with a boiling point of 346° F.–405° F. was added to the solution and emulsified by vigorous agitation. Fine droplets of the liquid hydrocarbon constituted the internal phase.

10 ml. of a 48% solution of methylene dianiline in methyl ethyl ketone was then added to the emulsion and thoroughly mixed in. The product was centrifuged to remove entrapped air bubbles and then cast as a film on plate glass. The film set to solid, shaped-retaining state after holding for 40 minutes at room temperature and 30 minutes at 40° C. The product was cured for three hours at 100° C. in a circulating air oven. At the end of this time the liquid hydrocarbon had been removed by evaporation leaving a tough, white, fine porous product which was readily stripped from the plate glass. After light buffing to remove the surface skin the water vapor transmission was 2.60 grams/30 cm.²/24 hours/16 mils.

EXAMPLE III 30 grams of glycol-adipate polyester urethane prepolymer having a molecular weight of about 1400 containing approximately 6.2% reactive —NCO was mixed with 1.65 grams of a nonionic silicone emulsifier and 25 ml. of methyl ethyl ketone.

60 ml. of the liquid paraffinic hydrocarbon used in Example II was added to the solution and vigorously agitated to disperse it as fine droplets constituting the internal phase of the resulting emulsion.

A molten mixture of 0.59 gram of trimethylolpropane, 0.033 gram of stannous octoate and 2.61 grams of methylene dianiline was added to the emulsion and thoroughly mixed. The mixture was centrifuged to remove entrapped air bubbles and cast as a film 0.020 inch in thickness on plate glass.

The film was allowed to set and was cured as in Example III to form a tough, flexible, white product 0.016 inch thick. The water vapor transmission of the unbuffed film was 2.45 grams/30 cm.²/24 hours/16 mils.

EXAMPLE IV 30 grams of the polyester urethane prepolymer used in Example III was mixed with 1.65 grams of nonionic silicone emulsifier and 20 ml. of methyl ethyl ketone. 47 ml. amyl ether was added to the solution and emulsified as the internal phase by vigorous agitation.

To the emulsion there was added and thoroughly mixed in a molten mixture of 0.59 gram of trimethylolpropane, 0.033 gram of stannous octoate and 2.61 grams of methylene dianiline. After the thorough incorporation of the molten mixture, the emulsion was centrifuged to remove entrapped air bubbles and cast as a film 0.020 inch in thickness on plate glass. The films set after maintenance of 30 minutes at room temperature and 30 minutes at 40° C. to a solid shape-retaining condition with the droplets of amyl ether entrapped in the solidified film. The film was cured at 120° C. for two hours at the end of which time the amyl ether had been evaporated. The product was a tough, flexible, white product 0.012 inch thick having a water vapor transmission of 0.55 gram/30 cm.²/24 hours/12 mils.

EXAMPLE V 60 grams of a polyether urethane prepolymer used in Example I was mixed with 3.5 grams of a nonionic silicone emulsifier, and 66 grams of a liquid paraffinic hydrocarbon mixture with a boiling point range of 346° F.– 405° F. was added and emulsified as fine droplets constituting the internal phase by vigorous agitation. The resulting emulsion was degassed and while being gently stirred was diluted with a mixture of 60 ml. of the same liquid hydrocarbon mixture and 60 ml. of methyl ethyl ketone. 5.76 grams of molten methylene dianiline was added and the emulsion was promptly cast as a film 0.032 inch in thickness on plate glass. 3½ minutes after the addition of methylene dianiline, a 55 mil thick needled nonwoven polypropylene fiber fabric with a collagen fiber structure therein formed by the process described in the U.S. patent of Shu-Tung Tu referred to above was laid down on the film and lightly rolled to insure good contact. The assembly was held at room temperature for 60 minutes, then cured at 100° C. for 60 minutes in the course of which time the volatile liquids were removed by evaporation. The cured coating was 15 mils thick.

The water vapor transmission of the coated sheet was 1.00 gram/30 cm.$^2$/24 hrs.

EXAMPLE VI

The procedure of Example III was repeated but using 30 ml. of methyl ethyl ketone and 87 ml. of the liquid paraffinic hydrocarbon.

The film when set and cured showed a water vapor permeability of 2.90 grams/30 cm.$^2$/2 hrs./16 mils.

EXAMPLE VII 10 grams of a polyester urethane prepolymer having a molecular weight of about 1200 containing approximately 10.6% reactive —NCO was mixed with 0.6 gram of a nonionic silicone emulsifier. 18 ml. of the liquid paraffinic hydrocarbon mixture was emulsified as the dispersed phase in the form of fine droplets by vigorous agitation.

3.34 grams of molten 4,4'-methylene-bis-(2-chloroaniline) was added and the emulsion stirred vigorously to insure mixture. A film of the reactive emulsion was cast onto plate glass and allowed to stand for 30 minutes at room temperature and then was placed in a circulating air oven for 60 minutes at 60° C. and 60 minutes at 110° C. The resulting film was free from volatile liquids which showed after light buffing, a water vapor permeability of 0.020 gram/30 cm.$^2$/24 hrs./25 mils.

EXAMPLE VIII 30 grams of a polyether urethane prepolymer of Example I was mixed with 2.5 grams of a nonionic silicone emulsifier and 30 ml. of methyl ethyl ketone. 64 ml. of the liquid paraffinic hydrocarbon mixture was dispersed as fine droplets in a continuous phase of the prepolymer by means of vigorous agitation. One gram of black pigment paste was added to the emulsion to provide color. 2.88 grams of molten methylene dianiline was added and uniformly mixed and the emulsion was then poured into a dish with raised wall sides. After standing at room temperature overnight, the slab was kept at 60° C. for 30 minutes and at 100° C. for 60 minutes. A center section of the resulting ¼" thick slab showed a water vapor permeability of .45 gram/30 cm.$^2$/24 hrs./35 mils.

EXAMPLE IX

A further portion of the reactive emulsion of Example VIII was knife coated onto a further portion of the collagen containing needled nonwoven polypropylene fiber mat used in Example V. 18 minutes after application of the coating, the coated material was heated at 60° C. for 30 minutes and at 100° C. for 60 minutes. The resulting coating was 15 mils thick and the water vapor permeability of the coated sheet was 0.61 gram/30 cm.$^2$/24 hrs.

EXAMPLE X 60 grams of the polyester urethane prepolymer used in Example II was mixed with 3.3 grams of a polyoxyalkylene derivative of sorbitan monooleate and 40 ml. of dimethyl formamide. 90 ml. of the liquid hydrocarbon was emulsified as the internal phase in this mixture by means of vigorous agitation.

10 ml. of 48% methylene dianiline in methyl ethyl ketone was then added and thoroughly mixed in. The reactive emulsion was centrifuged to remove air bubbles and cast on plate glass as a film 0.045 inch in thickness. After standing overnight at room temperature, the film was heated in a circulating air oven at 40° C. for 60 minutes and at 100° C. for three hours. The dried and cured film had a thickness of 0.030 inch. The water vapor permeability was 0.67 gram/30 cm.$^2$/24 hrs./30 mils.

EXAMPLE XI 60 grams of a glycol-adipate polyester having an OH number of 52.8 and an acid number of 1.5 was mixed with 2.47 grams of a polyoxyalkylene derivative of sorbitan monolaurate and 0.83 gram of sorbitan monolaurate, 1.25 grams of a 24% active solution of lead naphthenate and 7.75 grams of molten 4,4'-methylene-bis-(2-chloroaniline).

The mixture was placed in a container with dry nitrogen and 60 ml. of the liquid hydrocarbon was dispersed in the mixture in the form of fine droplets. 9.12 ml. of toluene diisocyanate was added to the emulsion and stirred in vigorously for 30 seconds. The mixture was then centrifuged to remove air bubbles and cast on plate glass. The film was heated at 40° C. for 30 minutes and at 120° C. for two hours. After buffing to remove a surface skin, the film had a water vapor permeability of 1.07 grams/30 cm.$^2$/24 hrs./13 mils.

EXAMPLE XII

Fine woven cotton fabric with a count of 90 x 100 was soaked in a 5% aqueous solution of polyvinyl alcohol, squeezed to remove excess solution and dried on a smooth, heated surface.

An emulsion identical with the emulsion prepared as described in Example III was laid down on a plate glass film as a layer 0.08" wet thickness. The dried fabric was laid down on the wet layer and the assembly was allowed to stand at room temperature for 15 minutes, then placed in a circulating air oven at which the air was held at 45° C. for 30 minutes and then at 120° C. for 90 minutes. The dried thickness of the coated fabric was 0.060" and the water vapor transmission was 1.81 grams/30 cm.$^2$/24 hours.

EXAMPLE XIII 40 grams of an —NCO terminated glycol-adipate polyester (of approximately 2000 molecular weight and approximately 43% available —NCO) and 2 grams of a polyoxyalkylene ether emulsifying agent were dissolved in 25 ml. of methyl ethyl ketone. 60 ml. of 1-chlorodecane were slowly added with agitation to form the internal phase of the emulsion. 6.8 ml. of 48% methylenedianiline in methyl ethyl ketone were then mixed in. The mixture was centrifuged to remove air bubbles and then cast into a glass dish with raised sides.

After standing overnight at room temperature the gelled mixture was heated at 60° C. for 2 hours and at 120° C. for 3 hours.

A slice from the center of the microporous article showed a water vapor permeability of 0.59 gm./30 cm.$^2$/24 hours/20 mils.

Having thus described my invention what I claim as new and desire to secure by Letters Patent of the United States is:

1. The process of forming a microporous solidified body consisting essentially of the steps of casting a body of water-free liquid emulsion of fine droplets of an organic liquid as the internal phase in a continuous phase comprising liquid reactive mixture convertible through reaction to a solidified, resilient, film forming reaction product, said reactive mixture comprising (A) an organic polyisocyanate providing at least two reactive —NCO groups per molecule and (B) an organic reactant having at least two active hydrogen atoms per molecule for reaction with said —NCO groups, said organic liquid having a boiling point of at least about 100° C. and at least 90% boiling below 232° C., being substantially nonsolvent for and nonreactive with said reactive mixture, being substantially immiscible in said continuous phase and being present in amount from about 60% to about 300% by weight based on the weight of the reactive mixture, reacting said mixture at a temperature below the boiling point of said organic liquid to cause the emulsion to gel and solidify substantially without expansion of said body and with said droplets held in the solidified body and evaporating said organic liquid without expanding said body leaving pores and discontinuities in the said body to constitute passageways for air and vapor.

2. The process of forming a microporous solidified body as defined in claim 1 in which said polyisocyanate comprises an —NCO terminated reaction product of at least one member of the group consisting of polyester polyols and polyether polyols with an organic compound providing at least two —NCO groups.

3. The process of forming a microporous solidified body as defined in claim 2 in which said body is a microporous permeable coating and said process includes as the casting step the application of said emulsion on a surface in a uniform layer.

4. The process of forming a microporous permeable coating as defined in claim 3 in which said continuous phase includes an organic liquid solvent, soluble in and substantially nonreactive with said reactive mixture to reduce the viscosity of said continuous phase and in which said organic liquid solvent is removed by evaporation from the solidified body.

5. The process of forming a microporous permeable coating on a surface as defined in claim 3 in which the liquid of said droplets is an aliphatic hydrocarbon having a boiling point of above about 130° C.

6. The process of forming a microporous permeable coating on a surface as defined in claim 3 in which the liquid of said droplets is an alkyl ether with a boiling point above about 130° C.

7. The process of forming a microporous permeable coating on a surface as defined in claim 3 in which the liquid of said droplets is a halogenated aliphatic hydrocarbon with a boiling point above about 130° C.

8. The process of forming a microporous solidified body as defined in claim 1 in which said body is a microporous permeable coating and said process includes as the casting step, the application of said emulsion on a surface in a uniform layer.

9. The process of forming a microporous permeable coating on a surface as defined in claim 8 in which the liquid emulsion is spread as a uniform layer on an impervious casting surface from which the layer is readily strippable after solidification, a porous fibrous sheet is laid down on said layer while said layer is still in liquid condition before solidification through reaction, said layer is thereafter reacted to bring it to solid condition and said fibrous sheet with the solidified layer adherent thereon is stripped from the impervious casting surface.

10. The process of forming a microporous permeable coating on a surface as defined in claim 9 in which said reactive mixture comprises (1) a polymeric —NCO terminated reaction product of at least one member of the group consisting of polyester polyols and polyether polyols with an organic polyisocyanate, said polymeric reaction product having at least two reactive —NCO groups per molecule, and (2) a chain extender having at least two members selected from the group consisting of amine and hydroxyl per molecule providing active hydrogens for combination with the —NCO group of said reaction product to form a higher molecular weight tough, strong, film forming material.

References Cited

UNITED STATES PATENTS

| | | | |
|---|---|---|---|
| 2,739,909 | 3/1956 | Rosenthal. | |
| 3,108,009 | 10/1963 | Clancy et al. | |
| 3,000,757 | 9/1961 | Johnston et al. | 117—63 |
| 3,100,721 | 8/1963 | Holden | 117—135.5 |
| 3,445,272 | 5/1969 | Newton | 117—119 |
| 3,450,650 | 6/1969 | Murata | 260—2.5 |
| 3,281,396 | 10/1966 | Barnes | 260—75 |
| 2,968,575 | 1/1961 | Mallonee | 106—287 |
| 3,072,582 | 1/1963 | Frost | 260—2.5 |
| 3,109,750 | 11/1963 | Roche | 117—98 |
| 3,121,699 | 2/1964 | Merriman | 260—2.5 |
| 3,190,842 | 6/1965 | Ringwood | 260—2.5 |
| 3,262,901 | 7/1966 | Lord | 260—32.8 |
| 3,236,812 | 2/1966 | McElroy | 260—33.2 |
| 3,403,046 | 9/1968 | Schwacke et al. | 117—102 |

FOREIGN PATENTS

| | | | |
|---|---|---|---|
| 1,394,356 | 2/1965 | France | 260—2.5 |

OTHER REFERENCES

Derwent, Belgian Patent Report, Oct. 25, 1967, abstracting Belgian Pat. No. 695,850, OPI date Sept. 1, 1967.

DONALD E. CZAJA, Primary Examiner

H. S. COCKERAM, Assistant Examiner

U.S. Cl. X.R.

117—63, 135.5; 260—75, 77.5